(12) United States Patent
Bellanger

(10) Patent No.: US 6,455,780 B2
(45) Date of Patent: Sep. 24, 2002

(54) BRANCH CONNECTION ACCESSORY FOR FITTING AT A JUNCTION BETWEEN TWO LENGTHS OF TRUNKING

(75) Inventor: Jerome Bellanger, Le Mans (FR)

(73) Assignees: Legrand, Limoges (FR); Legrand SNC, Limoges (FR)

(*) Notice: Subject to any disclaimer, the term of this patent is extended or adjusted under 35 U.S.C. 154(b) by 0 days.

(21) Appl. No.: 09/879,084

(22) Filed: Jun. 13, 2001

(30) Foreign Application Priority Data

Jun. 15, 2000 (FR) .............................. 00 07633

(51) Int. Cl.[7] ................................ H02G 3/06
(52) U.S. Cl. ................ 174/101; 174/48; 174/71 R; 174/72 R
(58) Field of Search .............. 174/48, 49, 66, 174/71 R, 72 R, 101; 52/220.7; 138/155; 248/27.1; 403/292, 294, 295; 439/210

(56) References Cited

U.S. PATENT DOCUMENTS

| | | | | |
|---|---|---|---|---|
| 2,297,139 A | * | 9/1942 | Flachbarth | 174/48 |
| 3,281,005 A | * | 10/1966 | Schumacher | 174/48 |
| 4,164,618 A | * | 8/1979 | Casasanta | 174/48 |
| 5,469,893 A | * | 11/1995 | Caveney et al. | 174/101 |
| 6,224,433 B1 | * | 5/2001 | Chadbourne et al. | 174/71 R |
| 6,281,434 B1 | * | 8/2001 | Gretz | 174/48 |
| 6,323,421 B1 | * | 11/2001 | Pawson et al. | 174/48 |

FOREIGN PATENT DOCUMENTS

| | | |
|---|---|---|
| EP | 0 776 078 A1 | 5/1997 |
| FR | 2 786 946 | 6/2000 |

* cited by examiner

*Primary Examiner*—Dean A. Reichard
*Assistant Examiner*—Adolfo Nino
(74) *Attorney, Agent, or Firm*—Young & Thompson

(57) ABSTRACT

A branch connection accessory for establishing a connection between first trunking which is fixed to a vertical support and second trunking which rests on a horizontal support includes a closure plate for closing the first trunking provided at its base with a communication opening to establish communication between the respective interior spaces of the first trunking and the second trunking. The communication opening is delimited laterally by legs each having at least one removable portion so that the height of the communication opening can be adapted to the relative position of the first trunking and the second trunking. A connection accessory is attached to the closure plate to close the communication opening from the outside and includes a canopy adapted to cover locally a closure cover section of the second trunking.

14 Claims, 5 Drawing Sheets

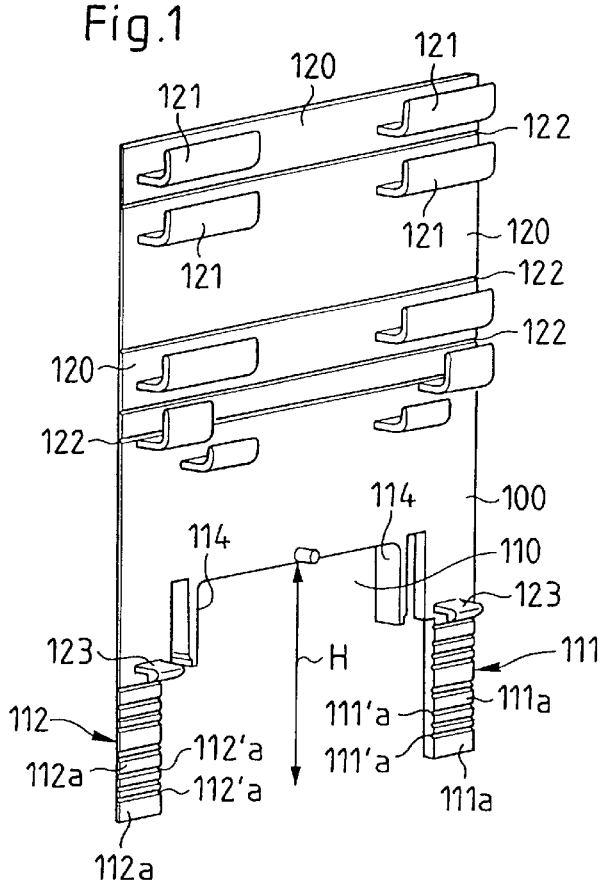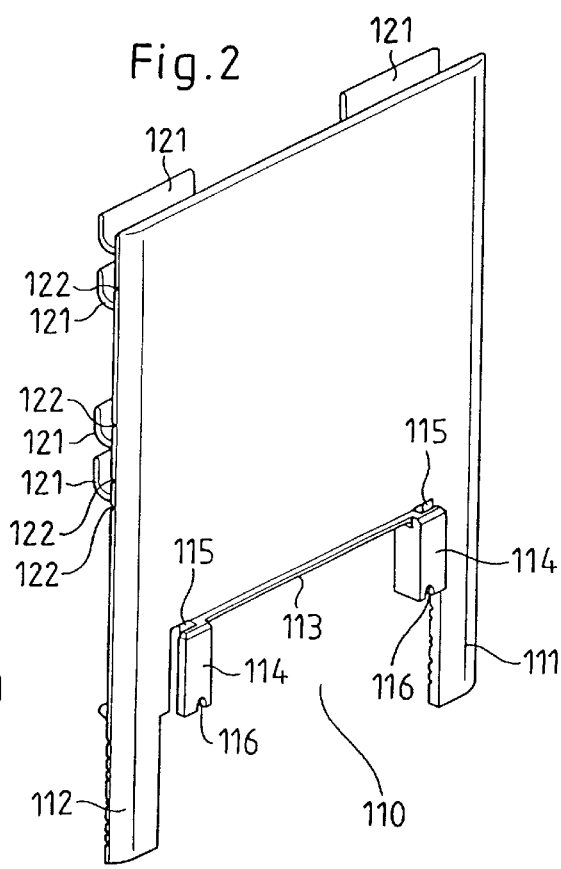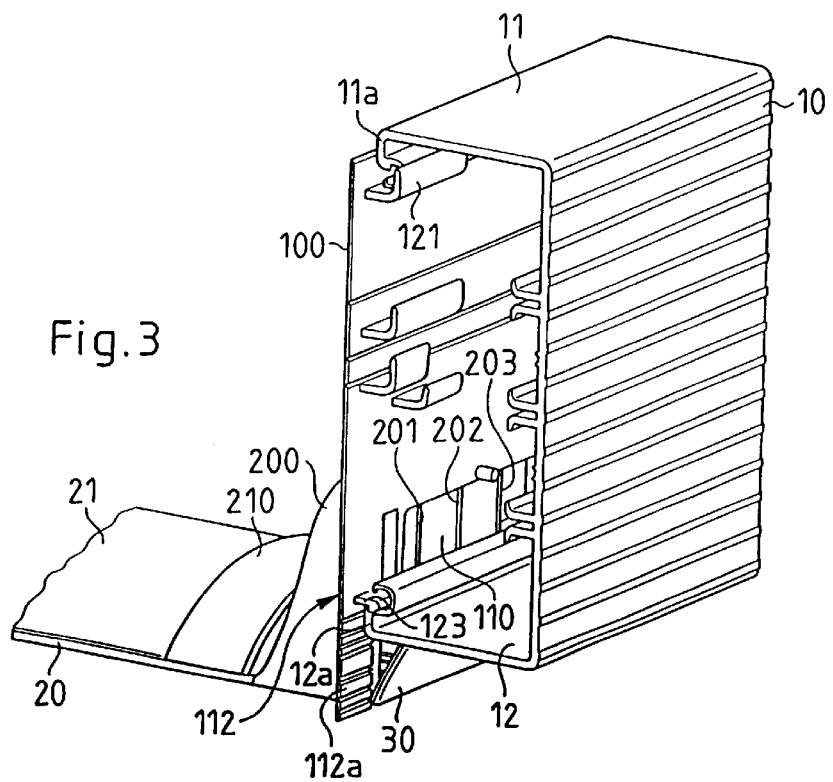

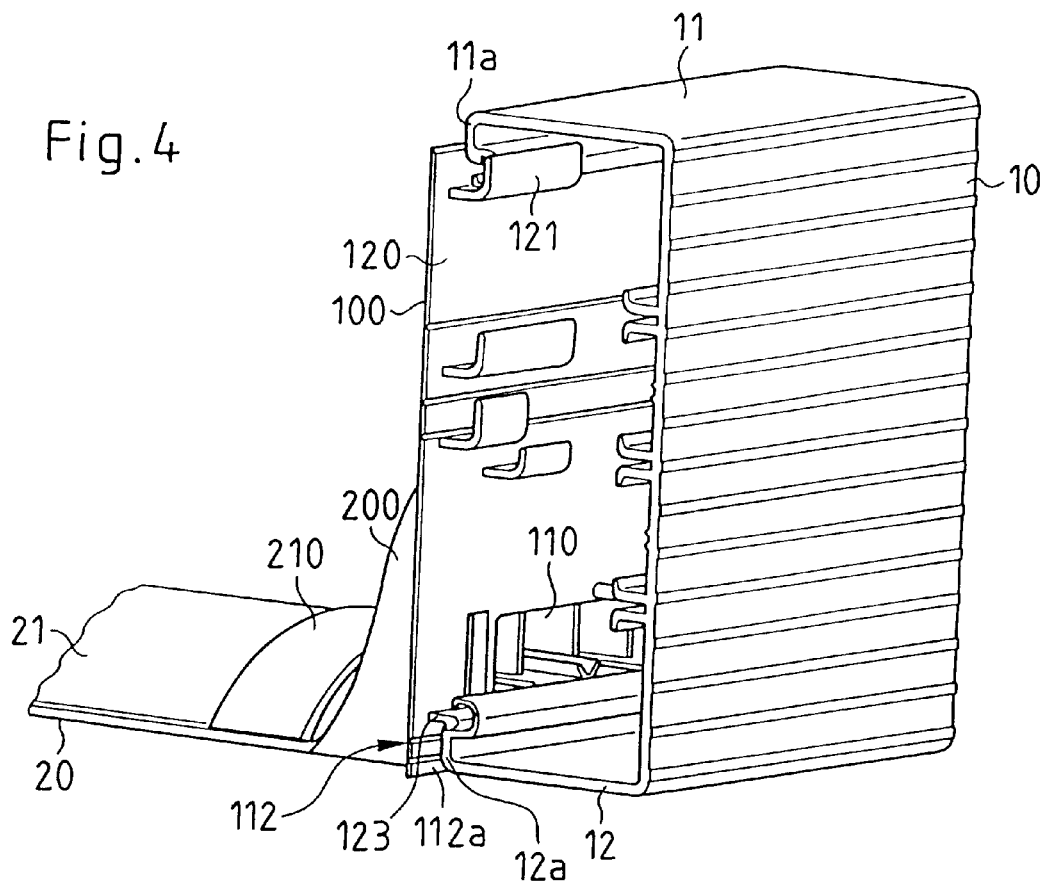
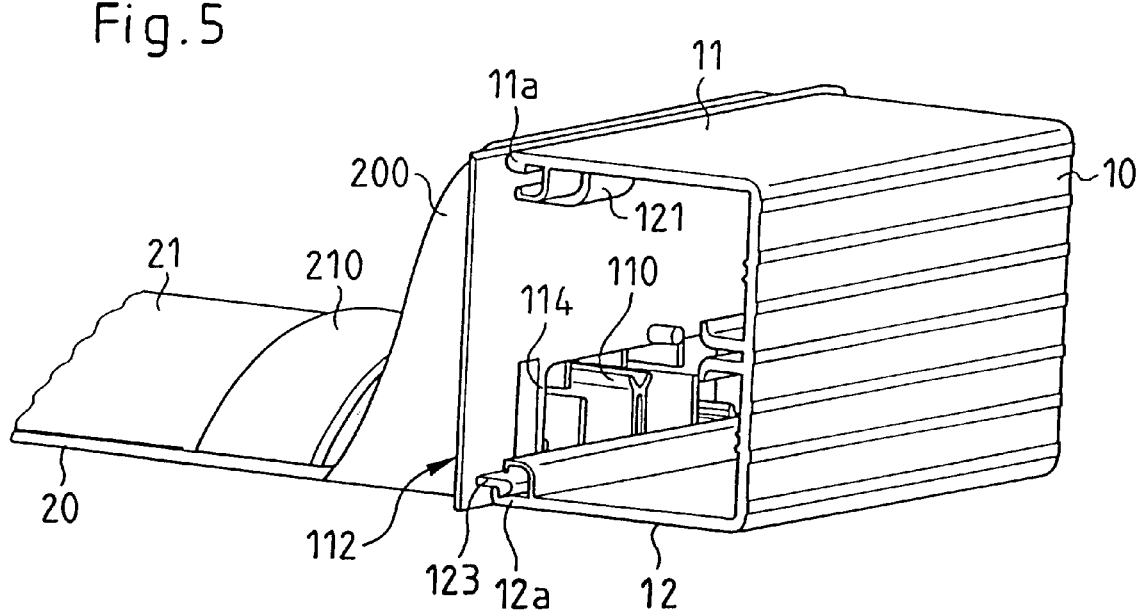

BRANCH CONNECTION ACCESSORY FOR FITTING AT A JUNCTION BETWEEN TWO LENGTHS OF TRUNKING

BACKGROUND OF THE INVENTION

1. Field of the Invention

The present invention relates to a branch connection accessory adapted to make the connection between first trunking which is fixed to a vertical support and second trunking which rests on a horizontal support.

The first trunking can be a molding or a baseboard and the second trunking is generally of the kind which passes through a floor. However, the second trunking could equally well be fixed to a ceiling.

2. Description of the Prior Art

One prior art branch connection accessory of the above kind includes a closure plate for the first trunking which has at its base an opening to establish communication between the interior spaces of the first and second trunking and a canopy extending horizontally from that opening adapted to cover locally the closure cover section of the second trunking.

The main drawback of the above kind of branch connection accessory is that the opening provided at the base of the closure plate has a fixed height because the canopy is formed in one piece with the closure plate. This kind of closure plate can therefore not be adapted to suit different trunking configurations and in particular cannot be adapted to suit different relative positions of the first and second trunking.

To comply with applicable safety standards in respect of electrical installations it is sometimes necessary for the first trunking, which is intended to be fixed to a vertical support, to rest on means for raising it so that it is at a particular distance from the floor.

This is the case when the trunking is intended to route electrical conductors having a conductive core surrounded by a single insulative sheath.

On the other hand, the first trunking can be positioned near the floor, without using means for raising it, if it is intended for routing double-insulated electrical cables.

Thus in an electrical installation adjacent vertical and horizontal trunking can have two different relative positions, a "close together" position when the vertical trunking does not rest on raising means and a "far apart" position when raising means are used.

At present it is necessary to provide a specific branch connection accessory to make the connection between the vertical and horizontal trunking for each of the relative positions described above.

Using two different branch connection accessories adds to the cost of an electrical installation.

SUMMARY OF THE INVENTION

To remedy the above drawback, the present invention proposes a branch connection accessory for establishing a connection between first trunking which is fixed to a vertical support and second trunking which rests on a horizontal support, the accessory including a closure plate for closing the first trunking provided at its base with a communication opening to establish communication between the respective interior spaces of the first trunking and the second trunking, which communication opening is delimited laterally by legs each having at least one removable portion so that the height of the communication opening can be adapted to the relative position of the first trunking and the second trunking, in which branch connection accessory a connection accessory is attached to the closure plate to close the communication opening from the outside and includes a canopy adapted to cover locally a closure cover section of the second trunking.

Accordingly, by removing one or more removable portions of the legs laterally delimiting the communication opening of the closure plate of the branch connection accessory according to the invention the height of the communication opening can be adapted to suit the relative position of the vertical and horizontal trunking and in particular the height of the opening can be adjusted so that the cross-section area of the connection between the vertical and horizontal trunking remains constant, whether or not raising means are used when installing the first trunking.

Thanks to the invention, it is then no longer necessary to provide specific branch connection accessories for different relative positions of the vertical and horizontal trunking. Instead a single accessory is sufficient and is adapted as required by the installer.

According to one particularly advantageous feature of the branch connection accessory according to the invention the communication opening of the closure plate has a horizontal top edge with vertical slideways at its ends for slidably mounting the connection accessory.

This has the advantage that the same connection accessory can be used for different heights of the communication opening in the closure plate, and can be mounted blind by sliding it in the two vertical slideways on the closure plate. It is therefore always correctly positioned facing the communication opening to close it correctly.

The two vertical slideways facilitate mounting the connection accessory on the closure plate, which saves time for the installer.

According to another advantageous feature of the branch connection accessory according to the invention it has a horizontal rim on the horizontal top edge of the communication opening of the closure plate to provide a connection between the vertical slideways and form a support for the connection accessory.

Other non-limiting advantageous features of the branch connection accessory according to the invention are as follows:

- each leg delimiting laterally the communication opening of the closure plate includes a plurality of removable portions;
- the closure plate has attachment means on its rear face for attaching it to a base section of the first trunking;
- the attachment means include a hook near the top edge of the closure plate which hooks onto the base section of the first trunking;
- the attachment means include a hook on the rear face of each leg of the closure plate;
- the closure plate has in its upper part at least one removable portion so that its height can be adapted to suit the width of the first trunking and the removable portion or each removable portion has on its rear face near a line of weakness attachment means for attaching it to a base section of the first trunking; the attachment means can include an upwardly-oriented hook;
- the closure plate has a plurality of vertical walls on its rear face spanning the top edge of the communication opening, oriented at 90 degrees to the plane of the rear face and delimiting between them ducts into which mutually-isolated electrical conductors or cables are inserted;

the connection accessory has a plurality of vertical walls on a rear face facing toward the communication opening, oriented transversely to the plane of the opening and delimiting between them ducts into which mutually-isolated electrical conductors or cables are inserted;

the closure plate has top and bottom edges that cover part of lateral flanges of a base section of the first trunking;

the closure plate has upstanding lateral edges; and the closure plate and the connection accessory are each molded in one piece from plastics material.

The following description, which is given with reference to the accompanying drawings, which are provided by way of non-limiting example, explains in what the invention consists and how it can be put into effect.

BRIEF DESCRIPTION OF THE DRAWINGS

FIGS. 1 and 2 are respectively rear and front views of a closure plate of a first embodiment of a branch connection accessory according to the invention.

FIG. 3 is a three-quarter perspective view of the first embodiment of the branch connection accessory according to the invention installed at the junction between two lengths of trunking when the first length of trunking rests on raising means.

FIG. 4 is a three-quarter perspective view of the branch connection accessory shown in FIG. 3 installed at the junction between two lengths of trunking when the first length of trunking does not rest on raising means.

FIG. 5 is a three-quarter perspective view of the branch connection accessory shown in FIGS. 3 and 4 whose closure plate has been adapted to suit narrow trunking positioned near the floor with no raising means.

DETAILED DESCRIPTION OF THE PREFERRED EMBODIMENTS

Figure 6:
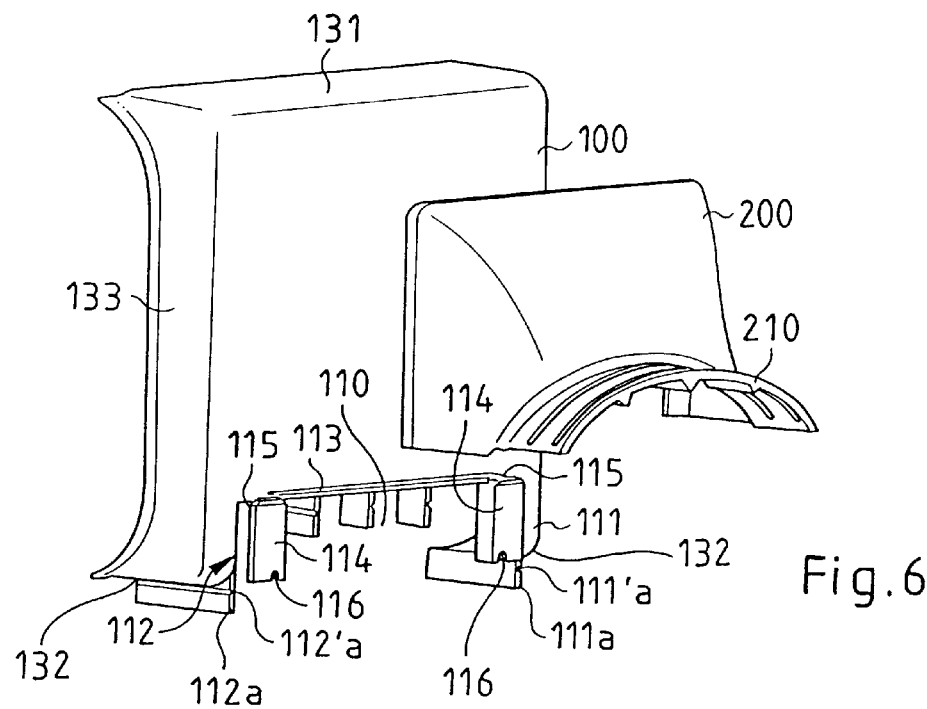
FIGS. 6 and 7 are respectively front and rear views of a second embodiment of a branch connection accessory according to the invention.

Note first that identical or similar components of the various embodiments of the invention are as far as possible identified by the same reference symbols in each figure and are not described again each time.

FIGS. 1 and 2 show a closure plate 100 of a first embodiment of a branch connection accessory intended to make the connection between first trunking 10 and second trunking 20 (see FIGS. 3 to 5). The first trunking 10 is fixed to a vertical support and the second trunking 20 rests on a horizontal support.

In this example the first trunking 10 can be a baseboard or a molding and the second trunking 20 can be of the kind which passes through a floor.

In this first embodiment the closure plate 100 is generally rectangular with a straight edge and is provided at its base with an opening 110 providing communication between the interior spaces of the first 10 trunking and the second trunking 20 (see FIGS. 3 to 5).

One advantageous feature of the closure plate 100 shown in FIGS. 1 and 2 is that the communication opening 110 is delimited by a top horizontal edge and laterally by legs 111, 112 featuring a plurality of removable portions 111a, 112a separated from each other by lines of weakness 111'a, 112'a so that the height H of the communication opening 110 can be adapted to suit the relative position of the first trunking 10 and the second trunking 20.

A horizontal rim 113 on the front face of the closure plate 100 and along the horizontal top edge of its communication opening 110 has at its ends vertical slideways 115 for slidably mounting a connection accessory 200 adapted to be attached to said closure plate 100 to close said communication opening 110. The connection accessory includes a canopy 210 adapted to cover locally the closure cover section 21 of the second trunking 20.

The connection accessory 200 is part of the branch connection accessory according to the invention described and shown in the figures.

The vertical slideways 115 are formed in blocks 114 that extend vertically from the horizontal rim 113. The blocks 114 have at their free end notches 116 in which upper ends of vertical ribs near the free edges of the base section of the trunking 20 that passes through the floor can engage when the communication opening 110 has a minimum height H (see FIG. 5 in particular).

Accordingly, for narrow vertical trunking 10, as shown in FIG. 5, and when no raising means are used, the ribs on the base section of the trunking 20 passing through the floor do not interfere with the ends of the blocks 114 in which the vertical slideways 115 of the closure plate are formed.

The closure plate 100 shown in FIGS. 1 and 2 advantageously has on its rear face means for attaching it to the base section of the first trunking 10.

In this example the attachment means include two upwardly-oriented hooks 121 near the top edge of the closure plate 100 and a downwardly-oriented hook 123 in the upper part of each leg 111, 112.

The hooks 121 cooperate elastically with the outside wall of the rim 11a of the top lateral flange 11 of the base section of the first trunking 10. The hooks 123 clip into a groove formed in the rim 12a of the bottom lateral flange 12 of the base section of the first trunking 10.

In the embodiment shown the upper part of the closure plate 100 includes a plurality of removable portions 120 which are separated from each other by lines of weakness 122 so that its height can be adapted to suit the width of the first trunking 10 to which it is attached.

Each removable portion 120 has on its rear face near a line of weakness 122 means for attaching it to the base section of the first trunking 10, in this example two spaced upwardly-oriented hooks 121 which attach to the rim 11a of a top lateral flange 11 of the base section of the trunking 10, as already explained.

Accordingly, by removing one or more of the removable portions 120 of the closure plate 100 its height can be adapted to close narrow trunking, as shown in FIG. 5, or its full height can be used to close wide trunking (see FIGS. 3 and 4).

The closure plate 100 is advantageously molded in one piece from a plastic material.

In the embodiment shown in FIGS. 1 to 5 the connection accessory 200 has a roof that caps the communication opening 110 of the closure plate 100 and a part extending substantially horizontally from the roof and forming a canopy 210 covering part of the closure cover section 21 of the trunking 20 that passes through the floor.

The rear face of the canopy of the connection accessory 200 faces toward the communication opening 110 and includes a plurality of vertical walls 201, 202, 203 oriented transversely to the plane of the communication opening 110 and delimiting between them ducts into which mutually-isolated electrical conductors or cables are inserted.

It may be necessary to isolate electrical conductors or cables carrying high currents from electrical conductors or cables carrying low currents. This is achieved by the vertical walls 201, 202, 203 of the connection accessory 200.

In the embodiment shown in FIGS. 1 to 5, the connection accessory 200 advantageously remains exactly the same, regardless of the height of the communication opening 110 of the closure plate 100 or the height of the closure plate 100 itself, and is easily positioned facing the communication opening 110 because it is slidably mounted in the vertical slideways 115 on the closure plate 100.

In only one case, when the first trunking 10 rests on raising means (see FIG. 3), the top edge of the roof of the connection accessory 200 rests on the horizontal rim 113 at the top edge of the communication opening 110, the rim 113 then forming a support for the connection accessory 200.

The connector accessory 200 is advantageously molded in one piece from a plastic material.

FIGS. 3 and 4 show the use of the closure plate 100 associated with the connection accessory 200 of the branch connection accessory for two different relative positions of the first trunking 10 and the second trunking 20.

In FIG. 3, the first trunking 10 rests on raising means (not shown) so that it is at a particular distance from the floor and therefore from the trunking 20 that passes through the floor and rests on the floor.

In this case, the communication opening 110 of the closure plate has a large height H. Only the end removable portions 111a, 112a of the lateral legs 111, 112 delimiting the communication opening 110 have been removed, to maintain a particular cross-section area for the communication between the interior spaces of the vertical first trunking 10 resting on the raising means and the trunking 20 that passes through the floor.

Furthermore, as shown in FIG. 3, a concealing member 30 is positioned under the vertical first trunking 10 to close the unused part of the communication opening 110 in the closure plate 100.

In the situation shown in FIG. 4 the first trunking 10 is identical to that shown in FIG. 3 but does not rest on raising means. Its bottom lateral flange 12 is therefore near the floor.

In this case the height H of the communication opening 110 of the closure plate is reduced by removing a plurality of the removable portions 111a, 112a of the lateral legs 111, 112 so that the cross-section area of the communication between the interior spaces of the first trunking and the second trunking is virtually identical to that provided in the configuration shown in FIG. 3.

Finally, FIG. 5 shows the use of the closure plate 100 of the branch connection accessory shown in FIGS. 1 and 2 with narrow first trunking 10 near the floor, i.e. not resting on raising means.

In this case, the removable portions 111a, 112a of the lateral legs 111, 112 delimiting the communication opening 110 have been removed to minimize the height of the communication opening 110 and maintain a crosssection area of the communication between the respective interior spaces of the trunking that is virtually identical to that of FIGS. 3 and 4. The removable portions 120 of the closure plate 100 have also been removed to adapt its height to suit the narrow width of the trunking.

As previously explained, in this case notches 116 at the end of the blocks 114 in which are formed the vertical slideways 115 for mounting the connecting accessory 200 advantageously form cut-outs for the free ends of vertical ribs near longitudinal edges of the base section of the trunking 20 that passes through the floor.

Figure 7:
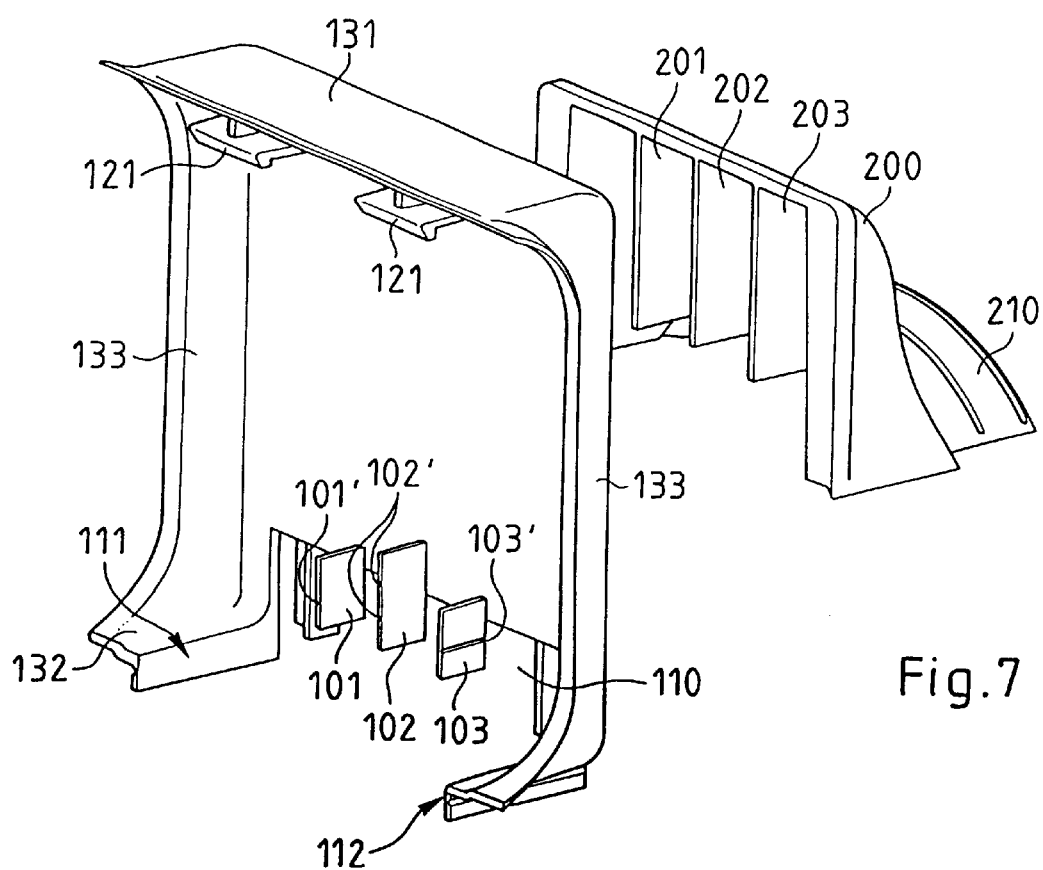

FIGS. 6 and 7 show a second embodiment of the branch connection accessory according to the invention in which the closure plate 100 has top and bottom edges 131, 132 which cover part of the lateral flanges of the base section of the first trunking 10.

This kind of closure plate 100 is advantageously used for baseboards with a rounded or domed enveloping or covering cover section (not shown).

The closure plate 100 also has upstanding lateral edges 133 which can adapt to the external shape of the enveloping cover section of the baseboard.

For attaching it to the base section of the first trunking, the closure plate. 100 incorporates two downwardly-oriented hooks 121 near its top edge 131 which hook onto external beads or rims provided on the lateral flange of the base section of the trunking.

In this case, as shown in FIG. 6 in particular, the lateral legs 111, 112 delimiting the communication opening 110 have removable portions 112a, 111a under the enveloping bottom edge 132 of the closure plate 100.

Three vertical walls 101, 102, 103 on the rear face of the closure plate 100 span the top edge of the communication opening 110. They are oriented at 90 degrees to the plane of the rear face and delimit between them ducts into which mutually-isolated electrical conductors or cables are inserted.

The vertical walls 101, 102, 103 come into corresponding relationship with the vertical walls 201, 202, 203 of the connection accessory 200 closing the communication opening 110 to extend the ducts into which the mutually-isolated electrical conductors or cables are inserted.

The heights of the vertical walls 101, 102, 103 on the closure plate can also be adapted to suit the height of the communication opening 110. To this end they are formed by at least two removable portions separated by lines of weakness 101', 102', 103'.

Figure 8:
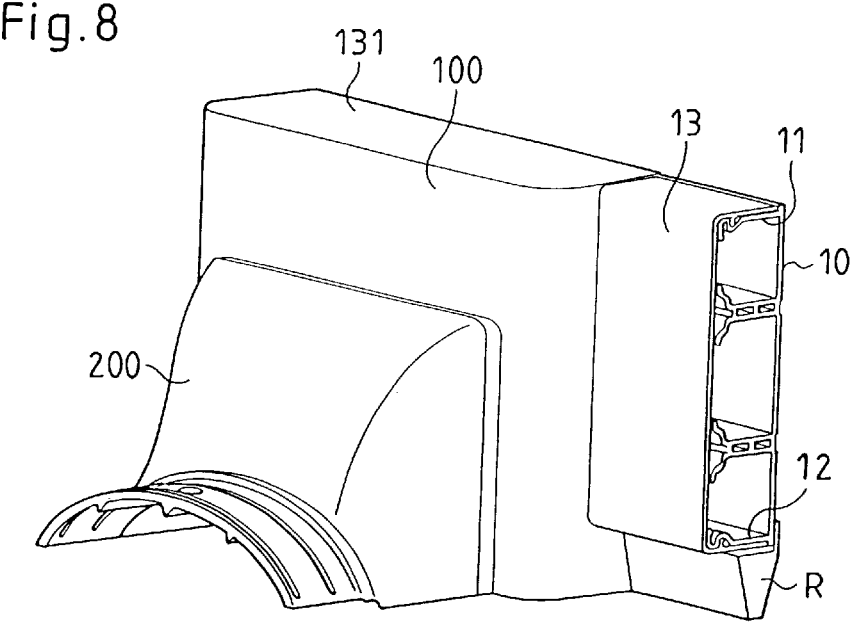
FIG. 8 is a front view of a third embodiment of a branch connection accessory according to the invention fitted to first trunking resting on raising means.
Figure 9:
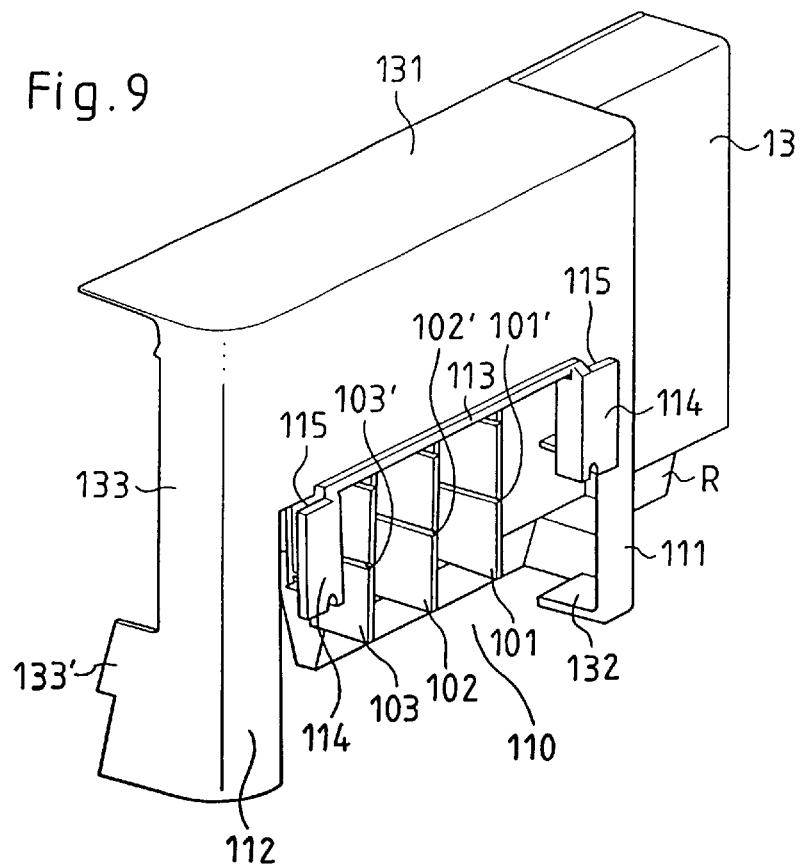
FIG. 9 is a front view of the closure plate of the branch connection accessory shown in FIG. 8.
Figure 10:
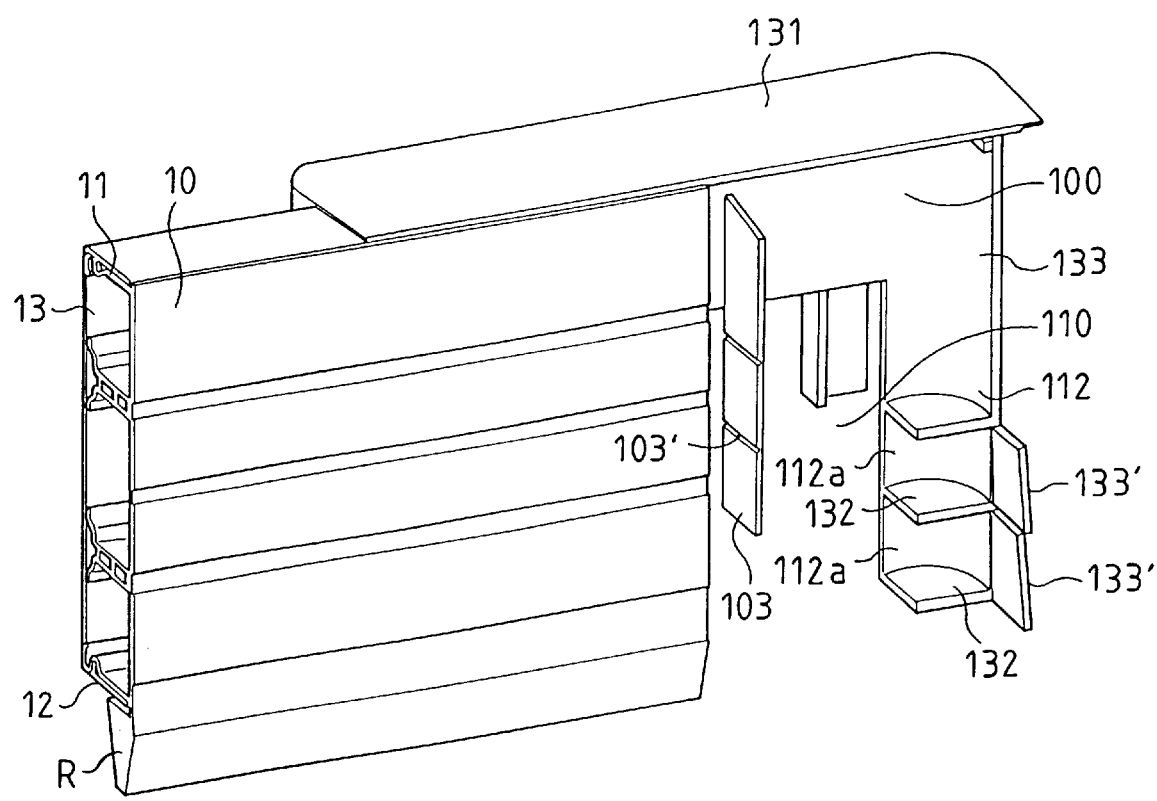
FIG. 10 is a rear view of the closure plate shown in FIG. 9.

FIGS. 8 to 10 show a third embodiment of the branch connection accessory according to the invention in which the closure plate 100 has top and bottom edges 131, 132 covering the lateral flanges 11, 12 of a molding 10, the closure plate being more particularly suited to a molding 10 which, with its cover section 13, forms a rectangular parallelepiped.

The legs 111, 112 laterally delimiting the communication opening 110 of the closure plate 100 also include removable portions 111a, 112a separated by tongues 132 defining the bottom edge of the closure plate 100 and serving as lines of weakness for removing them.

The closure plate 100 also has upstanding lateral edges 133 forming straight rims with a part 133' which is removable with the lateral legs 111, 112.

Finally, exactly as in the second embodiment, the closure plate 100 has a plurality of spaced vertical walls 101, 102, 103 on its rear face spanning the top edge of the communication opening 110. They are oriented at 90 degrees to the plane of the opening and delimit between them ducts for inserting mutually-isolated electrical conductors or cables.

The vertical walls 101, 102, 103 are formed by removable portions separated by lines of weakness 101', 102', 103' so that their height can be adapted to suit that of the communication opening 110.

Of course, the closure plates and connection accessories of the second and third embodiments shown in FIGS. 6 to 10 are each advantageously molded in one piece from a plastic material.

The present invention is in no way limited to the embodiments described and shown, variants of which conforming to the spirit of the invention will readily suggest themselves to the skilled person.

What is claimed is:

1. A branch connection accessory for establishing a connection between a first trunking which is fixed to a vertical support and a second trunking which rests on a horizontal support, said accessory comprising:

a closure plate for closing said first trunking, said closure plate comprising a base, a rear face, an upper part and a communication opening in the base to establish communication between respective interior spaces of said first trunking and said second trunking, which communication opening is delimited laterally by legs each having at least one removable portion so that the height of said communication opening can be adapted to the relative position of said first trunking and said second trunking; and a connection accessory attached to said closure plate to close said communication opening from the outside and includes a canopy adapted to cover locally a closure cover section of said second trunking.

2. The accessory claimed in claim 1 wherein said communication opening of said closure plate has a horizontal top edge with vertical slideways at its ends for slidably mounting said connection accessory.

3. The accessory claimed in claim 2 having a horizontal rim on the horizontal top edge of said communication opening of said closure plate to provide a connection between said vertical slideways and form a support for said connection accessory.

4. The accessory claimed in claim 1 wherein each leg delimiting laterally said communication opening of said closure plate includes a plurality of removable portions.

5. The accessory claimed in claim 1 further comprising attachment means on the rear face of said closure plate for attaching said closure plate to a base section of said first trunking.

6. The accessory claimed in claim 5 wherein said attachment means include a hook near a top edge of said closure plate which hooks onto said base section of said first trunking.

7. The accessory claimed in claim 5 wherein said attachment means include a hook on a rear face of each leg of said closure plate.

8. The accessory claimed in claim 1 wherein the upper part of said closure plate has at least one removable portion so that the height of said closure plate can be adapted to suit the width of said first trunking and the removable portion or each removable portion has on a rear face near a line of weakness attachment means for attaching said closure plate to a base section of said first trunking.

9. The accessory claimed in claim 8 wherein said attachment means include an upwardly-oriented hook.

10. The accessory claimed in claim 1 further comprising a plurality of vertical walls on the rear face of said closure plate spanning a top edge of said communication opening, oriented at 90 degrees to the plane of said rear face and delimiting between them ducts into which mutually-isolated electrical conductors or cables are inserted.

11. The accessory claimed in claim 1 wherein said connection accessory has a plurality of vertical walls on a rear face facing toward said communication opening, oriented transversely to the plane of said opening and delimiting between them ducts into which mutually-isolated electrical conductors or cables are inserted.

12. The accessory claimed in claim 1 wherein said closure plate has top and bottom edges that cover part of lateral flanges of a base section of said first trunking.

13. The accessory claimed in claim 12 wherein said closure plate has upstanding lateral edges.

14. The accessory claimed in claim 1 wherein said closure plate and said connection accessory are each molded in one piece from plastic material.

* * * * *